United States Patent
Hoppe et al.

(10) Patent No.: US 9,963,547 B2
(45) Date of Patent: May 8, 2018

(54) COMPOSITE COMPRISING A MATRIX MATERIAL MADE OF AN AMORPHOUS POLYAMIDE AND USE THEREOF

(71) Applicant: EMS-PATENT AG, Domat/Ems (CH)

(72) Inventors: Ralf Hoppe, Chur (CH); Justyna Trzaskowski, Mels (CH)

(73) Assignee: EMS-PATENT AG, Domat/Ems (CH)

( * ) Notice: Subject to any disclaimer, the term of this patent is extended or adjusted under 35 U.S.C. 154(b) by 0 days. days.

(21) Appl. No.: 14/740,736

(22) Filed: Jun. 16, 2015

(65) Prior Publication Data

US 2015/0368398 A1 Dec. 24, 2015

(30) Foreign Application Priority Data

Jun. 20, 2014 (EP) .................................. 14 173 332
Mar. 24, 2015 (EP) .................................. 15 160 633

(51) Int. Cl.

| | |
|---|---|
| *C08L 77/00* | (2006.01) |
| *C08G 69/26* | (2006.01) |
| *C08J 5/04* | (2006.01) |
| *B32B 27/34* | (2006.01) |
| *C08G 69/34* | (2006.01) |
| *C08G 69/36* | (2006.01) |
| *C08L 77/08* | (2006.01) |
| *B32B 5/02* | (2006.01) |
| *B32B 27/08* | (2006.01) |
| *B32B 27/20* | (2006.01) |

(52) U.S. Cl.
CPC ............ *C08G 69/265* (2013.01); *B32B 5/024* (2013.01); *B32B 27/08* (2013.01); *B32B 27/20* (2013.01); *B32B 27/34* (2013.01); *C08G 69/34* (2013.01); *C08G 69/36* (2013.01); *C08J 5/04* (2013.01); *C08J 5/042* (2013.01); *C08L 77/08* (2013.01); *B32B 2262/101* (2013.01); *B32B 2262/106* (2013.01); *B32B 2307/51* (2013.01); *B32B 2307/54* (2013.01); *B32B 2307/558* (2013.01); *B32B 2307/702* (2013.01); *B32B 2307/704* (2013.01); *C08J 2377/06* (2013.01); *C08J 2377/08* (2013.01)

(58) Field of Classification Search
None
See application file for complete search history.

(56) References Cited

U.S. PATENT DOCUMENTS

2009/0062452 A1* 3/2009 Harder .................. C08G 69/26
524/494
2010/0022742 A1* 1/2010 Buhler ................. C08G 69/265
528/323

FOREIGN PATENT DOCUMENTS

| CN | 1745124 A | 3/2006 |
|---|---|---|
| CN | 101328313 A | 12/2008 |
| EP | 0 229 731 B1 | 12/1992 |
| EP | 2 479 217 A1 | 7/2012 |
| EP | 2727951 A1 | 5/2014 |

OTHER PUBLICATIONS

State Intellectual Property Office of People's Republic of China, Search Report issued in Chinese Application No. 2015103446786 (dated Jun. 24, 2017).
State Intellectual Property Office of People's Republic of China, Office Action issued in Chinese Application No. 2015103446786 (dated Jul. 4, 2017).
State Intellectual Property Office of People's Republic of China, Second Office Action issued in Chinese Application No. 201510344678.6 (dated Jan. 17, 2018).

* cited by examiner

*Primary Examiner* — Robert T Butcher
(74) *Attorney, Agent, or Firm* — Leydig, Voit & Mayer, Ltd.

(57) ABSTRACT

The invention relates to a composite which comprises a matrix material made of an amorphous polyamide with a glass transition temperature of at least 180° C. The composites according to the invention are used for the production of reinforced components in the fields of sport, leisure, engineering industry, electronics, construction, medical technology, communication and transport means and aeronautical and aerospace engineering.

19 Claims, No Drawings

COMPOSITE COMPRISING A MATRIX MATERIAL MADE OF AN AMORPHOUS POLYAMIDE AND USE THEREOF

CROSS-REFERENCE TO RELATED APPLICATIONS

This application claims the benefit of European Patent Application No. 14 173 332.9, filed Jun. 20, 2014 and European Patent Application No. 15 160 633.2, filed Mar. 24, 2015, the disclosures of which are incorporated herein by reference in their entireties for all purposes.

The invention relates to a composite which comprises a matrix material made of an amorphous polyamide with a glass transition temperature of at least 180° C. The composites according to the invention are used for the production of reinforced components in the fields of sport, leisure, engineering industry, electronics, construction, medical technology, communication and transport means and aeronautical and aerospace engineering.

Materials with a high strength-weight ratio which are produced from a fibre-resin composite material are used in many fields where strength, corrosion resistance and low weight are desired. Thus, such fibre-resin composite materials can be used for example very well in components for aviation. Likewise, these composite materials are exceptionally suitable for items of sports equipment, such as e.g. tennis rackets or golf clubs.

In these composite materials, the reinforcement elements are present either in the form of unidirectional filaments, fibre networks, fibre fabrics or fibre layings.

The fibres in the form of filaments or networks, fabrics or layings are generally fixed or stabilized, which serves for simplified handling, and also the adhesion of individual or a plurality of these flat structures is made possible by temperature- or pressure effect. Stable pre-formation of the fixed or glued, single layer or multilayer flat structures to form preforms is likewise controllable by means of the influence of temperature and pressure. The thus produced and pre-treated, reinforcing materials are then embedded in a polymer matrix. The adhesion between reinforcing material and polymer matrix hereby is of particular importance.

Furthermore, approaches in which an additional fixing or stabilization of the fibres is dispensed with and the fibres are embedded directly in a polymer matrix are known from the state of the art.

Thus a composite is known from EP 0 229 731 B1, in which filaments are embedded in a matrix made of an amorphous polyamide. Partially aromatic polyamides are hereby used.

Composites are known from EP 2 479 217 A1, the matrix of which consists of an amorphous polyamide with a cyclohexylmethane framework and also a sulphonamide into which the fibres are embedded.

The systems known from the state of the art have in fact good mechanical properties, in particular good strength and rigidity, however they frequently have disadvantages with respect to thermostability and water absorption. High thermostability and low water absorption are basically required for example in the automobile sphere in the CDC furnace (cathodic dip coating). In the case of cathodic dip coating in the aqueous phosphate bath, the automobile body is coated with a layer of paint which acts as corrosion protection. Subsequent to the immersion bath, this paint layer is hardened in the CDC furnace at temperatures between 180-190° C. for 20-30 minutes. Composite components, such as for example the roof, which are resistant to the CDC furnace have the advantage that they do not, like conventional components, need to be applied modularly to the car body only after the CDC process. The water content of the composite component and hence the water absorption play an essential role in the CDC furnace. Since the water escapes from the material in the CDC furnace, the result can be an irregular paint surface, for which reason materials with low water absorption are advantageous.

It was therefore the object of the present invention to provide composites which eliminate the disadvantages of the prior art and have high thermal resistance, thermostability, low water absorption and no crystallization shrinkage and also exhibit, at the same time, the same or improved mechanical properties.

This object is achieved by the composite having the features of claim 1. In claim 15, uses according to the invention are indicated. The further dependent claims reveal advantageous developments.

According to the invention, a composite is provided, which comprises a matrix material made of an amorphous polyamide with a glass transition temperature (Tg) of at least 180° C. The amorphous polyamide is thereby formed from
 a) 10 to 50% by mol of at least one aromatic dicarboxylic acid selected from the group consisting of terephthalic acid, isophthalic acid and naphthalenedicarboxylic acid,
 b) 0 to 40% by mol of at least one aliphatic dicarboxylic acid,
 c) 0 to 10% by mol of at least one dimeric fatty acid,
 d) 17 to 50% by mol of at least one cycloaliphatic diamine selected from the group consisting of alkyl-substituted bis(4-aminocyclohexyl)methanes and alkyl-substituted bis (4-aminocyclohexyl)propanes,
 e) 0 to 33% by mol at least one further diamine which is different from component (d) and
 f) 0 to 30% by mol of at least one lactam or of an α,ω-amino acid,
the sum of the molar proportions of all the monomers adding up to 100% by mol and the at least one lactam or the α,ω-amino acid being comprised in a concentration of up to 30% by mol, relative to the sum of the molar proportions of all the diamines and all the dicarboxylic acids.

The amorphous polyamide according to the present invention preferably has a glass transition temperature (Tg) in the range of 180 to 220° C., in particular of 190 to 210° C.

The cycloaliphatic diamines of component (d) are, according to the invention, generally selected from the group consisting of alkyl-substituted bis(4-aminocyclohexyl)methanes and alkyl-substituted bis(4-aminocyclohexyl)propanes. In the sense of the invention, alkyl-substituted means that bis(4-aminocyclohexyl)methane and bis(4-aminocyclohexyl)propane carry one or two alkyl groups with 1 to 4 C atoms per cyclohexyl ring, preferably in 3- and/or 5 position. Methyl- or ethyl groups are preferred as alkyl groups. The cycloaliphatic diamines of component (d) are hence chosen for particular preference from the group consisting of bis(4-amino-3-methylcyclohexyl)methane (MACM), 2,2-bis(4-amino-3-methylcyclohexyl)propane, bis(4-amino-3-ethylcyclohexyl)methane (EACM), bis(4-amino-3,5-dimethylcyclohexyl)methane (TMDC). Preferably cycloaliphatic diamines MACM and TMDC are used.

The aromatic dicarboxylic acid of component (a) can be replaced up to 40% by mol, relative to the sum of all the dicarboxylic acids, by aliphatic dicarboxylic acid of component (b). Preferably, the aliphatic dicarboxylic acid is selected from the group consisting of adipic acid, azelaic acid, sebacic acid, 1,12-dodecanedioic acid, 1,14-tetradecanedioic acid, 1,18-octadecanedioic acid, 1,3-cyclohexanedicarboxylic acid and 1,4-cyclohexanedicarboxylic acid and combinations hereof, preferably with a proportion of 0.1 to 37% by mol and particularly preferred of 5 to 35% by mol, respectively relative to the amorphous polyamide.

Furthermore, the aliphatic dicarboxylic acid of component (c) is preferably selected from the group consisting of dimeric fatty acid with 36 C atoms and dimeric fatty acid with 44 C atoms, preferably with a proportion of 0 to 7% by mol and particularly preferred of 0.1 to 5% by mol, respectively relative to the amorphous polyamide.

According to the invention, the presence of a lactam or of an α,ω-amino acid is likewise possible for the formation of the amorphous polyamide. The lactam or the α,ω-amino acid is thereby preferably selected from the group consisting of ε-caprolactam, laurinlactam, 1,6-aminohexanoic acid and 1,12-aminododecanoic acid, preferably with a proportion of 0 to 25% by mol and particularly preferred of 0.1 to 20% by mol, respectively relative to the sum of the molar proportions of all the diamines and of all the dicarboxylic acids of the amorphous polyamide.

In the case where a part of the cycloaliphatic diamines of component (d) is replaced by other diamines of component (e), it is preferred that this at least one diamine is a cycloaliphatic diamine which is different from component (d) or is a linear or branched aliphatic diamine, preferably with a proportion of 0 to 25% by mol and particularly preferred of 0.1 to 15% by mol, respectively relative to the amorphous polyamide.

Preferred linear or branched aliphatic diamines (e) are selected from the group consisting of butanediamine, methylpentanediamine, hexamethylenediamine, methyloctanediamine, nonanediamine, decanediamine, dodecanediamine and trimethylhexamethylenediamine.

Preferred cycloaliphaticdiamines (e) are isophoronediamine (5-amino-1,3,3-trimethylcyclohexanemethaneamine), 1,3-diaminocyclohexane, 1,3-diaminomethylcyclohexane, 2,5- or 2,6-bis(aminomethyl)norbornane, 2,5- or 2,6-diaminonorbornane, 2,2-bis(4-aminocyclohexyl)methane, 2,2-bis(4-aminocyclohexyl)propane.

The amorphous polyamide is preferably selected from the group consisting of PA MACMI/12, PA MACMT/12, PA 6I/MACMI/12, PA 6T/MACMT/12, PA MACMI/MACMT/12, PA 6I/6T/MACMI/MACMT, PA 6I/6T/MACMI/MACMT/12, PA 6I/6T/MACMI/MACMT/MACM12, PA MACMI/MACMT/MACM12, PA TMDC12/TMDCT/TMDC36, PA TMDC12/TMDCI/TMDC36, PA TMDC12/TMDCI and PA TMDC12/TMDCT and preferably from the group consisting of PA MACMI/12, PA 6I/6T/MACMI/MACMT, PA MACMI/MACMT/MACM12, PA TMDC12/TMDCT/TMDC36 and PA TMDC12/TMDCT.

The amorphous polyamides according to the invention have a relative viscosity, measured according to ISO 307 (0.5 g in 100 ml m-cresol), in the range of preferably 1.3 to 1.8, preferably in the range of 1.4 to 1.7 and particularly preferred in the range of 1.45 to 1.65.

With respect to the end group concentration, the amorphous polyamide according to the invention preferably has a COOH end group concentration in the range of 10 to 150 mmol/kg, in particular of 20 to 120 mmol/kg and also an $NH_2$ end group concentration of 10 to 150 mmol/kg, in particular of 20 to 120 mmol/kg. Preferably, the amino end group concentration is greater than the carboxyl end group concentration.

The amorphous polyamide according to the invention preferably has a melting viscosity, determined according to ISO 1133 at 275° C. and a load of 5 kg, in the range of 100 to 5,000 Pas, in particular of 500 to 3,000 Pas.

A preferred embodiment provides that the composite comprises at least one fibre-containing material, in particular a unidirectional filament or another flat, fibre-containing material from the group of woven fabrics, fleeces, knitted fabrics, crocheted fabrics, layered fabrics or combinations hereof. The flat, fibre-containing materials are manufactured, according to the invention, from endless fibres, i.e. filaments.

The composites according to the invention can comprise one or more layers of flat reinforcing elements. In the components produced from the composite according to the invention, the fibre length corresponds almost to the component length.

Unidirectional filaments concern strips or tapes, with a width of 0.3 cm to 50 cm, the strips preferably having a width of 0.3 cm to 5.0 cm and the tapes preferably having a width of 5.01 cm to 50 cm.

According to the invention, the fibre-containing material does not include any cut fibres, as are used in the state of the art as reinforcing fillers.

The fibre-containing materials are selected particularly preferably from the group consisting of
  glass fibres,
  carbon fibres,
  mineral fibres,
  synthetic fibres, in particular polymer fibres, preferably made of polyesters and polyamides, in particular made of polyaramides,
  natural fibres, in particular cotton, wool, kapok, hemp, linen, jute or wood and also
  mixtures hereof.

It is further preferred that the composite comprises further additives, in particular selected from the group consisting of condensation catalysts, chain regulators, in particular monofunctional amines or carboxylic acids, defoamers, stabilizers, inorganic UV stabilizers, organic UV stabilizers, inorganic heat stabilizers, organic heat stabilizers, lubricants and colorants.

Preferably, the composite comprises
  30 to 90% by weight, preferably 35 to 70% by weight, particularly preferred 40 to 60% by weight, of the polyamide moulding compound,
  10 to 70%, preferably 30 to 65% by weight, particularly preferred 40 to 60% by weight, of fibre material and
  0 to 5% by weight, preferably 1 to 4% by weight, of additives.

The sum of the weight proportions of the individual components hereby adds up to 100% by weight.

The composites according to the invention are distinguished by the composites having a thermostability, measured as HDT C, of at least 175° C., preferably of at least 180° C. and particularly preferred of at least 190° C. Preferably, the thermostability of the composites, measured as HDT A, is at least 185° C., particularly preferred at least 190° C.

Furthermore, the composites according to the invention are distinguished by a high tensile strength of at least 480 MPa, preferably of at least 500 MPa. The composites also have high rigidity. The modulus of elasticity in tension is at least 30,000 MPa, preferably of at least 34,000 MPa and particularly preferred of at least 40,000 MPa.

The composites according to the invention are used for the production of reinforced components, in the fields of sport, leisure, engineering industry, electronics, construction, medical technology, communication and transport means and aeronautical and aerospace engineering.

In the transport means field, these are in particular structural components, preferably selected from the group consisting of passenger compartment, chassis, self-supporting bodywork or roof. Likewise attachments in the transport means field, such as mudguards, doors, tailgates, engine compartment bonnets, can consist of the composite according to the invention. Also components for vehicle interiors, such as decorative parts in the door, instrument panel or central panel, can consist of the composite.

Likewise, ship components, such as e.g. cabins, can be manufactured from the composite.

A further application concerns the production of seat shells made of the composite according to the invention.

Further application fields concern sports equipment, such as hockey sticks, tennis rackets, canoe paddles, parts of shoe soles, protective helmets.

In medical technology, components of medical appliances, X-ray couches can consist of the composite.

In engineering, robot parts, e.g. robot arms, or components of presses in metal reshaping are preferably made of the composite.

In the electronics field, in particular device housings, electric tools, mobile phone shells or satellite dish antennae are manufactured from the composite.

According to the invention, no components produced by injection moulding or extrusion are included.

The subject according to the invention is intended to be explained in more detail with reference to the subsequent examples without wishing to restrict said subject to the specific embodiments shown here.

Production of the Matrix

Polyamide A1

In a 300 l autoclave, 56.38 kg of TMDC, 24.13 kg of dodecanedioic acid, 15.35 kg of terephthalic acid, 4.69 kg of dimeric acid, 0.155 kg of Sandostab P-EPQ, 0.100 kg of Irganox 1098 and 0.050 kg of defoamer were mixed with 15.0 kg of soft water. The reaction mixture was heated sealed to 210° C. and a pressure of 20 bar was set. After 4 hours of homogenisation by means of agitation, the mixture was heated to 300° C. and agitated for a further 30 minutes. The pressure was subsequently reduced to 0 bar within 2.5 hours. The polymer was then agitated for a further 30 minutes at 300° C. in order to adjust the desired torque, it was subsequently discharged and granulated at 60° C. water bath temperature and with a short pass-through stretch.

Polyamide A2

Polyamide A2 was produced analogously to polyamide A1, benzoic acid being used as regulator and no dimeric acid being used. The weighed-in quantities were as follows:
TMDC: 60.42 kg
dodecanedioic acid: 36.40 kg
terephthalic acid: 11.26 kg
benzoic acid: 0.11 kg Polyamide A3

Polyamide A3 was produced analogously to polyamide A1, MACM being used as diamine instead of TMDC and, as diacids, IPS instead of dimeric acid. The weighed-in quantities were as follows:
MACM: 54.90 kg
dodecanedioic acid: 24.37 kg
terephthalic acid: 10.10 kg
isophthalic acid: 10.30 kg In Table 1, the matrix materials which are used in the examples and comparative examples and the properties thereof are listed.

TABLE 1

| Material | Description | Manufacturer |
|---|---|---|
| polyamide A1 | amorphous polyamide TMDC12/TMDCT/TMDC36 in the molar ratio 51/45/4 made of bis(4-amino-3,5-dimethylcyclohexyl)methane, dodecanedioic acid, terephthalic acid and dimeric fatty acid with 36 C atoms<br>relative viscosity: 1.53<br>melt viscosity: 2,900 Pas<br>end groups COOH: 30 mmol/kg, NH2: 110 mmol/kg<br>glass transition temperature: 197° C.<br>modulus of elasticity in tension: 2,000 MPa<br>notch impact strength: 5 kJ/m$^2$<br>water absorption: 2% | EMS-CHEMIE AG, Switzerland |
| polyamide A2 | amorphous polyamide TMDC12/TMDCT in the molar ratio 70/30 made of bis(4-amino-3,5-dimethylcyclohexyl)methane, dodecanedioic acid and terephthalic acid<br>relative viscosity: 1.53<br>melt viscosity: 1,100 Pas<br>end groups COOH: 100 mmol/kg, NH2: 100 mmol/kg<br>glass transition temperature: 193° C.<br>modulus of elasticity in tension: 1,900 MPa<br>notch impact strength: 8 kJ/m$^2$<br>water absorption: 3% | EMS-CHEMIE AG, Switzerland |
| polyamide A3 | amorphous polyamide MACMI/MACMT/MACM12 in the molar ratio 27/27/46 made of bis(3-methyl-4-aminocyclohexyl)methane, isophthalic acid, terephthalic acid and dodecanedioic acid<br>relative viscosity: 1.54<br>melt viscosity: 1,700 Pas<br>end groups COOH: 40 mmol/kg, NH2: 120 mmol/kg<br>glass transition temperature: 200° C.<br>modulus of elasticity in tension: 2,100 MPa<br>notch impact strength: 10 kJ/m$^2$<br>water absorption: 2% | EMS-CHEMIE AG, Switzerland |
| polyamide 66 | partially crystalline polyamide 66 made of hexamethylenediamine and adipic acid (trade name Radipol A 45)<br>relative viscosity: 1.72<br>melting point: 260° C. | Radici Chimica, Italy |

TABLE 1-continued

| Material | Description | Manufacturer |
|---|---|---|
| | modulus of elasticity in tension: 3,700 MPa<br>notch impact strength: C 4 kJ/m$^2$<br>water absorption: 8-9% | |
| polyamide 12 | partially crystalline polyamide 12 made of laurinlactam<br>relative viscosity: 1.63<br>melting point: 178° C.<br>modulus of elasticity in tension: 1,500 MPa<br>notch impact strength: 6 kJ/m$^2$<br>water absorption: 1.5% | EMS-CHEMIE AG,<br>Switzerland |
| polyamide 6I/6T | amorphous polyamide 6I/6T (molar ratio 66:34) made of hexamethylenediamine, isophthalic acid and terephthalic acid<br>relative viscosity: 1.56<br>glass transition temperature: 125° C.<br>modulus of elasticity in tension: 3,000 MPa<br>notch impact strength: 8 kJ/m$^2$<br>water absorption: 7.5% | EMS-CHEMIE AG,<br>Switzerland |
| heat stabiliser | N,N'-hexane-1,6-diylbis[3-(3,5-di-tert-butyl-4-hydroxyphenyl propionamide, CAS-No. 23128-74-7<br>trade name Irganox 1098 | BASF,<br>Germany |
| heat stabiliser | tetrakis(2,4-di-tert-butylphenyl)-4,4'-biphenyl diphosphonite, CAS-No. 119345-01-6<br>Trade name Sandostab P-EPQ | Clariant,<br>Switzerland |

The polyamides listed in Table 1 were converted by cryogenic grinding and subsequent sieving into powder with a particle size in the range of 0 to 500 μm (d50 in the range of 150-350 μm). These polyamide powders were used for production of the composite.

Layer Structure

The laminates were provided by means of hand lamination. The laminates thereby consisted of 12 (for tension bars) or 14 (for impact bars) layers carbon fibre woven material (Toho Tenax, 245 g/m$^2$ with epoxy coats, twill weave) and a matrix made of amorphous polyamide A1, A2, or A3 (140 g/m$^2$ powder top layer).

The woven layers were constructed symmetrically and orthotropically relative to each other so that the following layer structure was produced: 0°, +45°, 90°, −45° (this arrangement is repeated in the subsequent woven material layers).

The laminates were coated as follows:
1. providing Teflon film as lowermost layer
2. scattering on powder (matrix material) on the Teflon film
3. placing woven material layer
4. scattering powder on the woven material layer
5. placing woven material layer
6. scattering powder on the woven material layer etc.
7. scattering powder on the uppermost woven material layer and covering with Teflon film As quantity of powder between the individual layers, 140 g/m$^2$ was used. This structure is consolidated in an intermittent press (by the Collin company) with heat and pressure; the pressing process is implemented twice for complete consolidation.

In Table 2, the process conditions for the 1$^{st}$ and 2$^{nd}$ heating-cooling-pressing cycle are listed.

TABLE 2

| | Examples | | | Comparative examples | | |
|---|---|---|---|---|---|---|
| | 1 | 2 | 3 | 4 | 5 | 6 |
| Process condition<br>1. heating-cooling-pressing cycle | | | | | | |
| pressing temperature [° C.] | 280 | 250 | 320 | 250 | 330 | 330 |
| pressing time [s] | 120 | 120 | 120 | 120 | 150 | 120 |
| pressure during heating process [bar] | 25 | 25 | 25 | 25 | 25 | 25 |
| pressure during cooling process [bar] | 50 | 50 | 50 | 50 | 50 | 50 |
| cooling time [s] | 600 | 600 | 600 | 600 | 600 | 600 |
| Process condition<br>2. heating-cooling-pressing cycle | | | | | | |
| pressing temperature [° C.] | 280 | 270 | 310 | 330 | 330 | 330 |
| pressing time [s] | 300 | 300 | 300 | 300 | 300 | 300 |
| pressure during heating process [bar] | 25 | 25 | 25 | 25 | 25 | 25 |
| pressure during cooling process [bar] | 50 | 50 | 50 | 50 | 50 | 50 |
| cooling time [s] | 600 | 600 | 600 | 600 | 600 | 600 |

The produced organo sheets had the following dimensions: 30×30 cm; 3 mm thickness (for tension test) or 4 mm thickness (for HDT measurements).

Production of the Tension Bars

The tension bars of dimension 250×25×3 mm and the impact bars of dimension 80×10×4 mm were cut out of the respective organo sheets by means of water jets.

Within the scope of the present invention, the following measuring methods were used; if nothing different has been noted, the test pieces were tested in the dry state:

Melting point and glass transition temperature (Tg):
ISO 11357
granulate

Differential scanning calorimetry (DSC) was implemented at a heating rate of 20 K/min. At the melting point, the temperature is indicated at the peak maximum. The centre of the glass transition range which is indicated as glass transition temperature (Tg) was determined according to the "Half-step-height" method.

Modulus of Elasticity:
ISO 527-4 with a tensile speed of 1 mm/min
ISO tension test bar type 3,250×25×3 mm, temperature 23° C.

Tensile Strength:
ISO 527-4 with a tensile speed of 5 mm/min
ISO tension test bar type 3,250×25×3 mm, temperature 23° C.
Impact Strength according to Charpy:
ISO 179/*eU
ISO test piece, standard: ISO/CD 3167, type B1, 80×10×4 mm,
temperature 23° C.
*1=non-instrumented, 2=instrumented
Notch impact strength according to Charpy:
ISO 179/*eA
ISO test piece, standard: ISO/CD 3167, type B1, 80×10×4 mm,
temperature 23° C.
*1=non-instrumented, 2=instrumented
Relative Viscosity
ISO 307
granulate
0.5 g in 100 ml m-cresol
temperature 20° C.
calculation of the relative viscosity (RV) according to RV=t/$t_0$
following section 11 of the standard.
Water Absorption
ISO 62
sheets 100×100×1 mm
storage in water at 23° C.
End groups (amino- and carboxyl end groups)
The amino ($NH_2$) and carboxyl (COOH) end group concentrations were determined by means of a potentiometric titration. For the amino end groups, 0.2 to 1.0 g of polyamide or polyamide oligomer are dissolved, for this purpose, in a mixture of 50 ml of m-cresol and 25 ml of isopropanol at 50 to 90° C. and, after addition of aminocaproic acid, are titrated with a 0.05 molar perchloric acid solution. For determination of the COOH end groups, 0.2 to 1.0 g of the sample to be determined is dissolved, according to solubility, in benzyl alcohol or in a mixture of o-cresol and benzyl alcohol at 100° C. and, after addition of benzoic acid, titrated with a 0.1 M tetra-n-butyl ammonium hydroxide solution.
Melt Viscosity
ISO 1133
granulate
275° C., load weight 5 kg In Table 3, thermal and mechanical properties of the composites with a fibre content of 50% by volume and various matrices are presented.

The composite materials of examples 1, 2 and 3 have high thermostabilities in the range of 180 to 193° C. (HDT C). In comparison thereto, the composites of comparative examples 5 and 6 have 10 to 70° C. lower HDT C values. The composite of comparative example 4 has, relative to the materials of examples 1, 2 and 3, higher thermostability, however this material with 3.2% in comparison has an approx. 30% increased water absorption and shows significant crystallization shrinkage.

The composites of examples 1, 2 and 3, with values in the range of 490-560 MPa, have in addition higher tensile strengths, compared with comparative examples 4 to 5.

The invention claimed is:
1. A composite which comprises a matrix material made of a fibre-containing material and an amorphous polyamide with a glass transition temperature (Tg) of at least 180° C. formed from
a) 10 to 50% by mol of at least one aromatic dicarboxylic acid selected from the group consisting of terephthalic acid, isophthalic acid and naphthalenedicarboxylic acid,
b) 0 to 40% by mol of at least one aliphatic dicarboxylic acid,
c) 0 to 10% by mol of at least one dimeric fatty acid,
d) 17 to 50% by mol of at least one cycloaliphatic diamine selected from the group consisting of alkyl-substituted bis(4-aminocyclohexyl)methanes and alkyl-substituted bis(4-aminocyclohexyl)propanes, and
e) 0 to 33% by mol of at least one further diamine which is different from component (d) and
f) 0 to 30% by mol of at least one lactam or of an α,ω-amino acid,
the sum of the molar proportions of a) to e) adding up to 100% by mol and the at least one lactam or the α,ω-amino acid being comprised in a concentration of up to 30% by mol, relative to the sum of the molar proportions of all the diamines and of all the dicarboxylic acids,
wherein the fibre-containing material is selected from the group consisting of woven fabrics, fleeces, knitted fabrics, crocheted fabrics, layered fabrics, and combinations thereof; and
wherein the amorphous polyamide is formed from a) to f) such that d) includes at least bis(4-amino-3,5-dimethylcyclohexyl)methane (TMDC).
2. The composite according to claim 1, wherein the amorphous polyamide has a glass transition temperature (Tg) in the range of 180 to 220° C.

TABLE 3

| Property | Unit | Examples | | | Comparative examples | | |
|---|---|---|---|---|---|---|---|
| | | 1 | 2 | 3 | 4 | 5 | 6 |
| Matrix | | A1 | A2 | A3 | PA 66 | PA 12 | PA 6I/6T |
| Tg | ° C. | 197 | 200 | 193 | — | — | 125 |
| Tm | ° C. | — | — | — | 260 | 178 | — |
| HDT C | ° C. | 192 | 193 | 180 | 213 | 168 | 108 |
| HDT A | ° C. | 204 | 200 | 190 | 255 | 177 | 120 |
| Tensile strength | MPa | 560 | 490 | 550 | 410 | 460 | 470 |
| Modulus of elasticity in tension | MPa | 45,000 | 35,000 | 37,000 | 34,000 | 37,000 | 42,000 |
| Water absorption | % | 0.8 | 1.2 | 1.0 | 3.2 | 0.6 | 2.8 |

* the matrices comprise respectively 0.3% heat stabilisers
Tm = melting temperature,
Tg = glass transition temperature 3. The composite according to claim 1, wherein the aliphatic dicarboxylic acid is selected from the group consisting of adipic acid, azelaic acid, sebacic acid, 1,12-dodecanedioic acid, 1,14-tetradecanedioic acid, 1,18-octadecanedioic acid, 1,3-cyclohexanedicarboxylic acid and 1,4-cyclohexanedicarboxylic acid and combinations thereof, with a proportion of 0.1 to 37% by mol, respectively relative to the sum of a) to f).

4. The composite according to claim 1, wherein the dimeric fatty acid is selected from the group consisting of dimeric fatty acid with 36 C atoms and dimeric fatty acid with 44 C atoms.

5. The composite according to claim 1, wherein the cycloaliphatic diamine of d) includes bis(4-amino-3,5-dimethylcyclohexyl)methane (TMDC) and one or more cycloaliphatic diamines selected from the group consisting of bis(4-amino-3-methylcyclohexyl)methane (MACM), 2,2-bis(4-amino-3-methylcyclohexyl)propane, and bis(4-amino-3-ethylcyclohexyl)methane (EACM).

6. The composite according to claim 1, wherein the at least one lactam or the at least one α,ω-amino acid is selected from the group consisting of ε-caprolactam, laurinlactam, 1,6-aminohexanoic acid and 1,12-aminododecanoic acid.

7. The composite according to claim 1, wherein the at least one further diamine which is different from d) is selected from the group consisting of butanediamine, methylpentanediamine, hexamethylenediamine, methyloctanediamine, nonanediamine, decanediamine, dodecanediamine, trimethylhexamethylenediamine, isophoronediamine (5-amino-1,3,3-trimethylcyclohexanemethaneamine), 1,3-diaminocyclohexane, 1,3-diaminomethylcyclohexane, 2,5- or 2,6-bis(aminomethyl)norbornane, 2,5- or 2,6-diaminonorbornane, 2,2-bis(4-aminocyclohexyl)methane, 2,2-bis(4-aminocyclohexyl)propane.

8. The composite according to claim 1, wherein the amorphous polyamide is selected from the group consisting of PA TMDC12/TMDCT/TMDC36, PA TMDC12/TMDC/TMDC36, PA TMDC12/TMDCI and PA TMDC12/TMDCT, and optionally one or more of PA MACMI/12, PA MACMT/12, PA 6I/MACMI/12, PA 6T/MACMT/12, PA MACMI/MACMT/12, PA 6I/6T/MACMI/MACMT, PA 6I/6T/MACMI/MACMT/12, PA 6I/6T/MACMI/MACMT/MACM12, PA MACMI/MACMT/MACM12.

9. The composite according to claim 1, wherein the woven fabrics, fleeces, knitted fabrics, crocheted fabrics, and layered fabrics contain fibres are selected from the group consisting of
glass fibres,
carbon fibres,
mineral fibres,
synthetic fibres,
natural fibres, and
mixtures thereof.

10. The composite according to claim 1, wherein the composite comprises one or more further additives selected from the group consisting of condensation catalysts, chain regulators, defoamers, stabilisers, inorganic UV stabilisers, organic UV stabilisers, inorganic heat stabilisers, organic heat stabilisers, lubricants and colourants.

11. The composite according to claim 1, wherein the composite comprises
30 to 90% by weight of the polyamide moulding compound,
10 to 70 by weight, of the fibre-containing material and
0 to 5% by weight of further additives,
the sum of the weight proportions of the individual components adding up to 100% by weight.

12. The composite according to claim 1, wherein the composite has a thermostability, measured as HDT C, of at least 175° C.

13. The composite according to claim 1, wherein the composite has a tensile strength of at least 480 MPa, or a modulus of elasticity in tension of at least 30,000.

14. The composite according to claim 2, wherein the amorphous polyamide has a Tg in the range of 190 to 210° C.

15. The composite according to claim 2, wherein the aliphatic dicarboxylic acid is selected from the group consisting of adipic acid, azelaic acid, sebacic acid, 1,12-dodecanedioic acid, 1,14-tetradecanedioic acid, 1,18-octadecanedioic acid, 1,3-cyclohexanedicarboxylic acid and 1,4-cyclohexanedicarboxylic acid and combinations thereof, with a proportion of 0.1 to 37% by mol, respectively relative to the amorphous polyamide.

16. The composite according to claim 2, wherein the dimeric fatty acid is selected from the group consisting of dimeric fatty acid with 36 C atoms and dimeric fatty acid with 44 C atoms.

17. The composite according to claim 2, wherein the cycloaliphatic diamine of d) includes bis(4-amino-3,5-dimethylcyclohexyl)methane (TMDC) and one or more cycloaliphatic diamines selected from the group consisting of bis(4-amino-3-methylcyclohexyl)methane (MACM), 2,2-bis(4-amino-3-methylcyclohexyl)propane, and bis(4-amino-3-ethylcyclohexyl)methane (EACM).

18. The composite according to claim 2, wherein the at least one lactam or the at least one α,ω-amino acid is selected from the group consisting of ε-caprolactam, laurinlactam, 1,6-aminohexanoic acid and 1,12-aminododecanoic acid.

19. A composite which comprises a matrix material made of a fibre-containing material and combinations of polyamides,
wherein the combination of polyamides is (a) TMDC12, TMDCT, and TMDC36 in a molar ratio 51/45/5 or (b) TMDC12 and TMDCT in a molar ratio of 70/30,
wherein the fibre-containing material is selected from the group consisting of woven fabrics, fleeces, knitted fabrics, crocheted fabrics, layered fabrics, and combinations thereof.

* * * * *